United States Patent [19]
Kull et al.

[11] Patent Number: 5,491,979
[45] Date of Patent: Feb. 20, 1996

[54] APPARATUS FOR COOLING FOOD STUFFS, ESPECIALLY IN AN AIRCRAFT

[75] Inventors: Harald Kull, Krummesse; Thomas Scherer, Hamburg; Siegfried Seidler, Westerwaldsede, all of Germany

[73] Assignee: Daimler-Benz Aerospace Airbus GmbH, Hamburg, Germany

[21] Appl. No.: 345,903

[22] Filed: Nov. 28, 1994

[30] Foreign Application Priority Data

Nov. 26, 1993 [DE] Germany .................. 43 40 316.0

[51] Int. Cl.⁶ ........................................... F25D 17/02
[52] U.S. Cl. .................. 62/185; 62/237; 62/239; 62/438; 165/104.28; 165/919
[58] Field of Search ................. 62/237, 239, 430, 62/438, 185, 480; 165/104.28, 104.33, 919

[56] References Cited

U.S. PATENT DOCUMENTS

| | | | |
|---|---|---|---|
| 2,938,686 | 5/1960 | Van Winkle et al. | 62/239 X |
| 3,690,118 | 9/1972 | Rainwater | 62/237 X |
| 4,034,572 | 7/1972 | Morris et al. | 62/237 X |
| 4,077,228 | 3/1978 | Schumacher et al. | 62/237 X |
| 4,402,188 | 9/1983 | Skala | 62/430 X |
| 4,748,823 | 6/1988 | Asano et al. | 62/438 X |

FOREIGN PATENT DOCUMENTS

4105034  8/1992  Germany.

Primary Examiner—William E. Tapolcai
Attorney, Agent, or Firm—W. G. Fasse; W. F. Fasse

[57] ABSTRACT

Food stuffs transported in trolleys are cooled on board of an aircraft directly in the trolley which has a heat exchange surface connected to a secondary coolant flow circuit in the trolley. When the trolley is parked in a parking space for example in an aircraft galley, the heat exchange surface of the trolley is in heat exchange contact with a heat exchanger connected to a central primary refrigerant circuit including a refrigerating unit (4). The heat exchange surface of the trolley and a heat exchange surface of the heat exchanger are connected to separate refrigerant circulating circuit, whereby leaks are avoided while the direct surface contact between the two heat exchange surfaces assures a substantially improved efficiency in the heat exchange.

30 Claims, 4 Drawing Sheets

APPARATUS FOR COOLING FOOD STUFFS, ESPECIALLY IN AN AIRCRAFT

CROSS REFERENCE TO RELATED APPLICATION

This application is related to commonly owned, copending U.S. application Ser. No. 08/345,910, entitled: SYSTEM FOR COOLING FOOD IN AN AIRPLANE, filed on Nov. 28, 1994, the entirety of which is incorporated herein by reference.

FIELD OF THE INVENTION

The invention relates to cooling of food stuffs in a transport trolley. Such trolleys are used, for example, to supply food to passengers in an aircraft.

BACKGROUND INFORMATION

Galleys or kitchen areas in passenger aircraft are equipped with parking spaces for food transport trolleys. It is necessary to store these food stuffs including drinking liquids at sufficiently low temperatures to keep the food stuffs fresh. The transport trolleys have standardized dimensions substantially independent of the aircraft type because such trolleys are used on a worldwide basis and must be suitable for insertion into the above mentioned parking spaces of different aircraft types. These trolleys are filled with food stuffs on the ground and precooled so that they are loaded into the aircraft galley at cooling temperatures. However, these cooling temperatures inside the transport trolleys must be maintained until the food is distributed to the passengers.

Heretofore it has been customary to cool food stuffs on board of an aircraft by various means, for example so-called dry ice, namely carbon dioxide in solid form or cooled air have been used. The cooled air is blown either directly through the transport trolleys or facilities are provided to envelope the transport containers or trolleys by a cool air flow.

The cooling by using dry ice has the disadvantage that it reduces the space available for food stuffs because a special compartment must be provided in the upper section of the transport trolley for holding plates of compressed $CO_2$ snow. Sublimation generates cold $CO_2$ gas which falls downwardly to thereby envelope the food stuffs and cool the same. Due to the sublimation the available cooling time is limited and another disadvantage is seen in that the cooling capacity is not controllable, except for the initial selection of the volume of dry ice which is limited by the above mentioned space considerations.

German Patent Publication DE-OS 4,105,034 A1 (Plassmeier et al.) discloses a trolley cooling system in which cooled air is blow into a chamber separated from the space holding the food stuffs in the trolley. Cooling coils or ducts are exposed in the chamber to the flow of the cool air. These cooling coils or ducts are positioned with most of their length in the walls of the transport trolley. The air in the cooled air flow circuit is cooled in turn by a refrigeration unit such as a compression cold vapor machine or air chiller or by a heat exchanger which in turn is cooled at the outer skin of the aircraft body.

The just described air cooling system uses air as a heat carrier, whereby the proper sealing of the air flow circuit is a substantial problem because air leaks are virtually unavoidable. As a result, substantial energy losses are also unavoidable resulting in a low efficiency. Additionally, the available useful space in the transport trolley is reduced by the chamber in which portions of the cooling coils or ducts are exposed to the cool air. Such a reduction of the useful space is a substantial disadvantage, especially in connection with passenger aircraft in which space is at a premium. The reduction of the useful space by the cooling chamber usually results in an increase in the number of total transport trolleys required which in turn increases the packing space for the trolleys and additional trolleys increase the total weight of the aircraft.

OBJECTS OF THE INVENTION

In view of the above it is the aim of the invention to achieve the following objects singly or in combination:

to provide a cooling system for food stuffs in a transport trolley, especially for use in an aircraft, in which energy losses are minimized to thereby increase the cooling efficiency, while simultaneously optimizing the available useful space that can hold food stuffs;

to maintain the conventional, standardized dimensions of such food transport trolleys while simultaneously substantially reducing the space needed for cooling purposes;

to reduce or eliminate sealing problems and thus leaks in such transport trolley cooling systems; and to cool food stuff containers by external surface contact with a heat exchanger.

SUMMARY OF THE INVENTION

The above objects have been achieved according to the invention in that the above mentioned parking spaces for the trolleys are equipped with at least one heat exchanger so positioned that a first heat exchange surface of a primary cooling circuit can contact at least one second heat exchange surface of a secondary cooling circuit in a trolley containing the food stuffs. Each trolley is equipped with the secondary cooling circuit in which a heat carrier, e.g. a -glycol-mixture, is circulating in heat exchange contact with the respective second heat exchange surface of the trolley. The secondary cooling circuit is primarily installed in the walls of the trolley. The heat exchanger or exchangers receives cooling energy that is being transferred to the transport trolley through the mentioned first and second heat exchange surfaces, whereby the heat exchanger is cooled by a central refrigeration unit. The heat exchange surfaces of the heat exchanger and of the trolley are totally closed, whereby leakage problems are avoided and the cooling efficiency is respectively increased. The heat transfer takes place through surface contact between the first and second heat exchange surfaces.

Cooling chambers, for example for taking up dry ice or for passing cooling air through such chambers are avoided according to the invention, thereby optimizing the available useful space for holding food stuffs. Thus, the present trolleys may retain their conventional outside dimensions while providing an optimal interior space for holding food stuffs.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
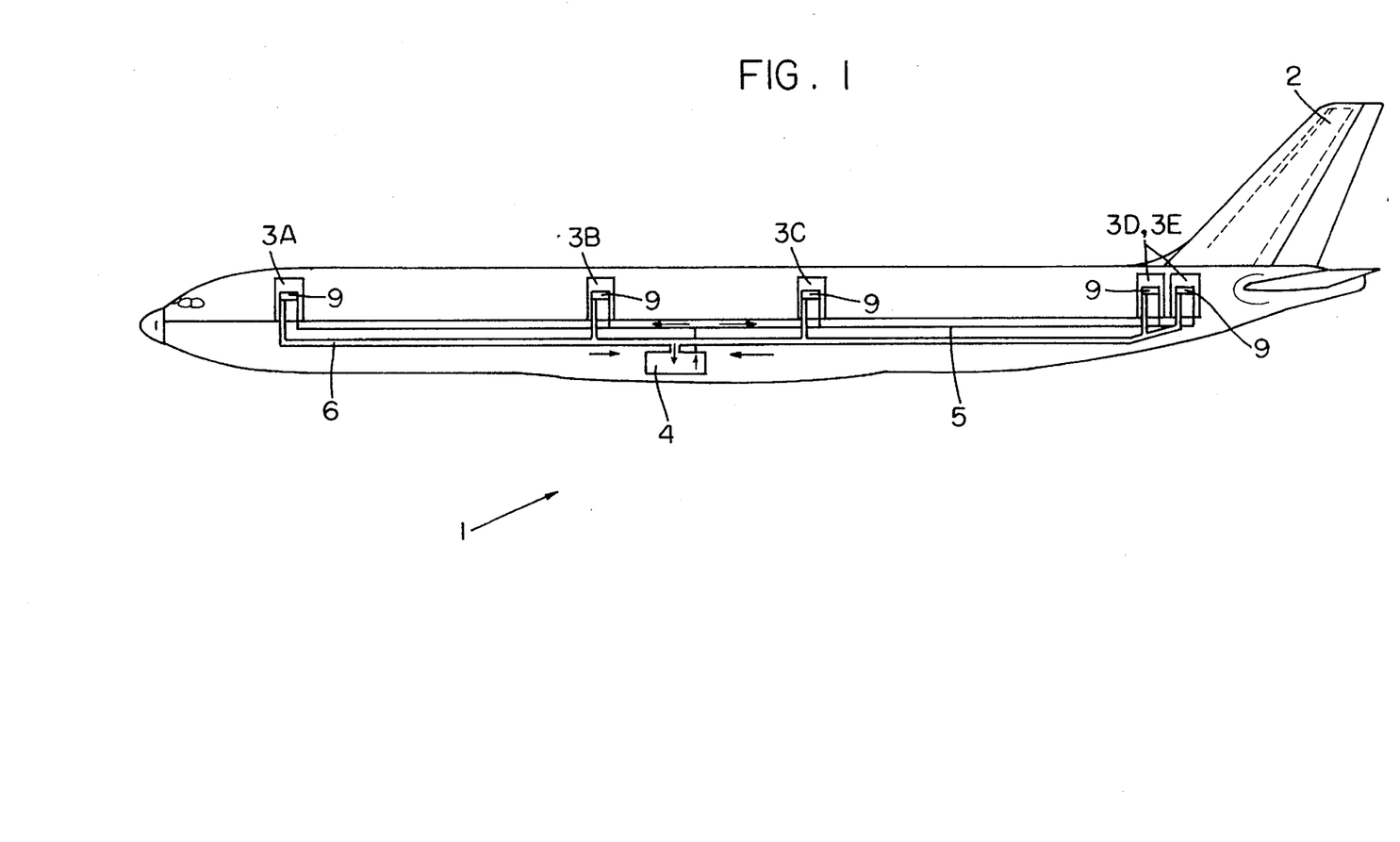
FIG. 1 shows schematically an aircraft body with five galleys and a central cooling system provided in common for the cooling of transport containers or trolleys in parking spaces provided in the galleys.

FIG. 1 shows an aircraft 2 equipped with a cooling system 1 for cooling food stuffs in five galleys 3A, 3B, 3C, 3D, and 3E. The central cooling system 1 comprises a refrigeration unit 4 connected through a liquid refrigerant circulating pipe or duct to heat exchangers 9 in the galleys to supply cool liquid to these heat exchangers which in turn are connected through a vaporized coolant or refrigerant return pipe or duct 6 to the refrigeration unit 4 which is provided in common for all heat exchangers not shown in FIG. 1. The pipe or duct 5 for the liquid supply has a smaller inner diameter than the inner diameter of the pipe or duct 6 through which evaporated coolant or refrigerant flows.

Figures 4, 5:
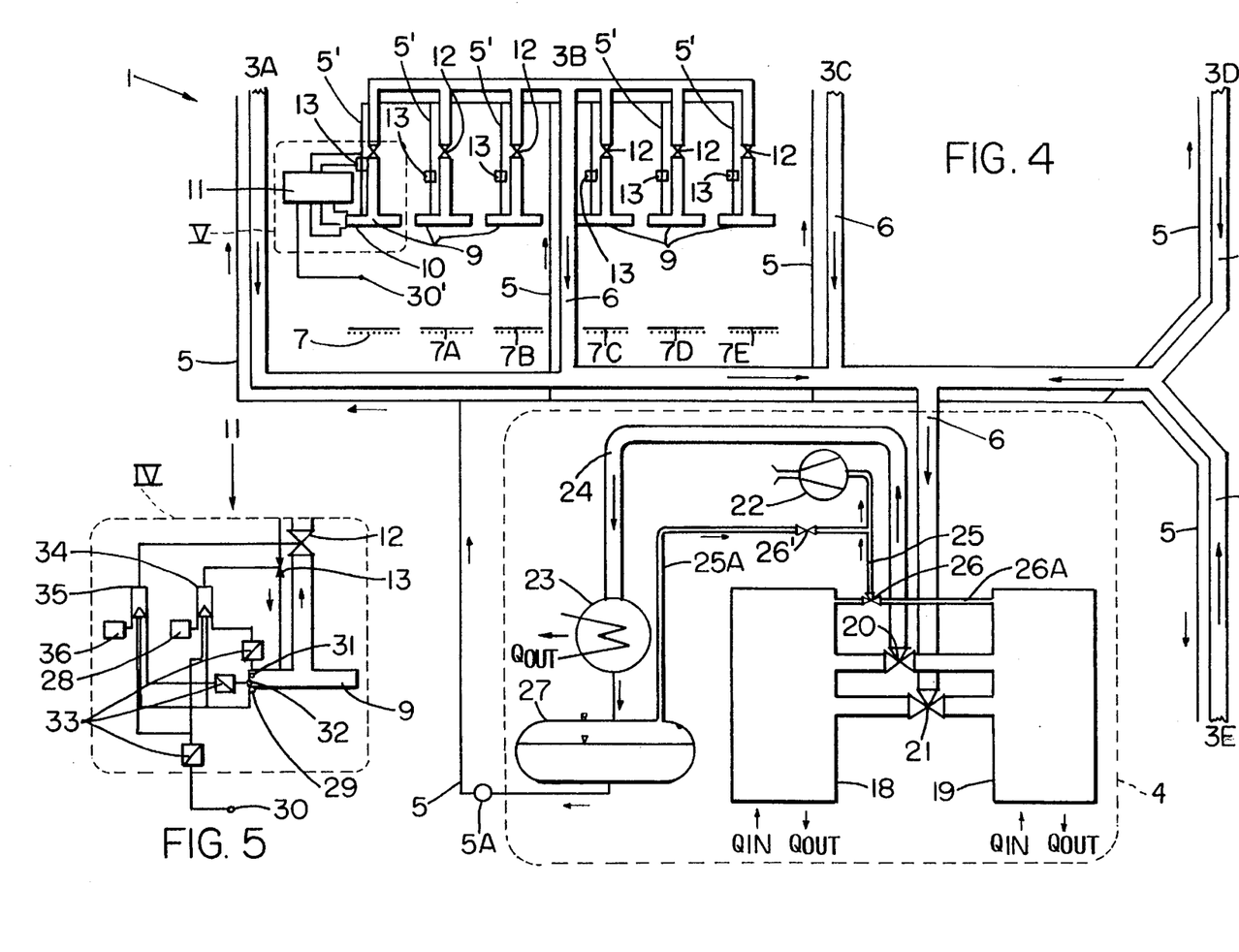
FIG. 4 shows a plurality of heat exchangers cooled by a common refrigeration unit constructed as a sorption refrigeration device.
FIG. 5 shows a closed looped control for controlling the circulation of refrigerant through the heat exchangers.

The galleys 3A to 3E are equipped with parking spaces 7, 7A, 7B, 7C, 7D and 7E shown, for example, in FIG. 4. The supply duct 5 for the refrigerant, for example water, and the return duct 6 for the vaporized refrigerant are installed in the aircraft body with a proper heat insulation for supplying cooling energy to each of the galleys 3A to 3E. The refrigeration unit 4 may be constructed in any suitable manner capable of supplying the required cooling energy to the heat exchangers 9 in each galley. These heat exchangers 9 are, for example, constructed as evaporators for cooling a heat carrier circulating in the secondary heat exchange circuit in each trolley. The refrigeration unit 4 forms part of the primary cooling circuit with the pipes or ducts 5 and 6. The heat carrier in the secondary cooling circuit transmits the cooling energy taken up from the heat exchanger 9 to the food stuffs contained in the transport trolley.

As mentioned, the refrigeration unit 4 may be of any conventional construction. Thus, in an embodiment not shown in the drawing a refrigeration unit is used which makes it possible to in turn use secondary cooling circuits available in conventional galleys. Thus, it is possible to use instead of a compressor cold vapor machine, a heat exchanger device, preferably an evaporator, whereby conventionally available secondary cooling circuits in the galleys can be utilized without any costly refittings. Such heat exchanger units preferably work without chlorofluorocarbons (CFCs) as coolants or refrigerants. For example, chlorofluorocarbons can be avoided when the refrigeration unit 4 is constructed as a sorption device. In any of these embodiments it is possible to use a single central refrigeration unit 4 for all galleys in the aircraft 3 provided that the central refrigeration unit 4 delivers the required cooling capacity.

Figure 2:
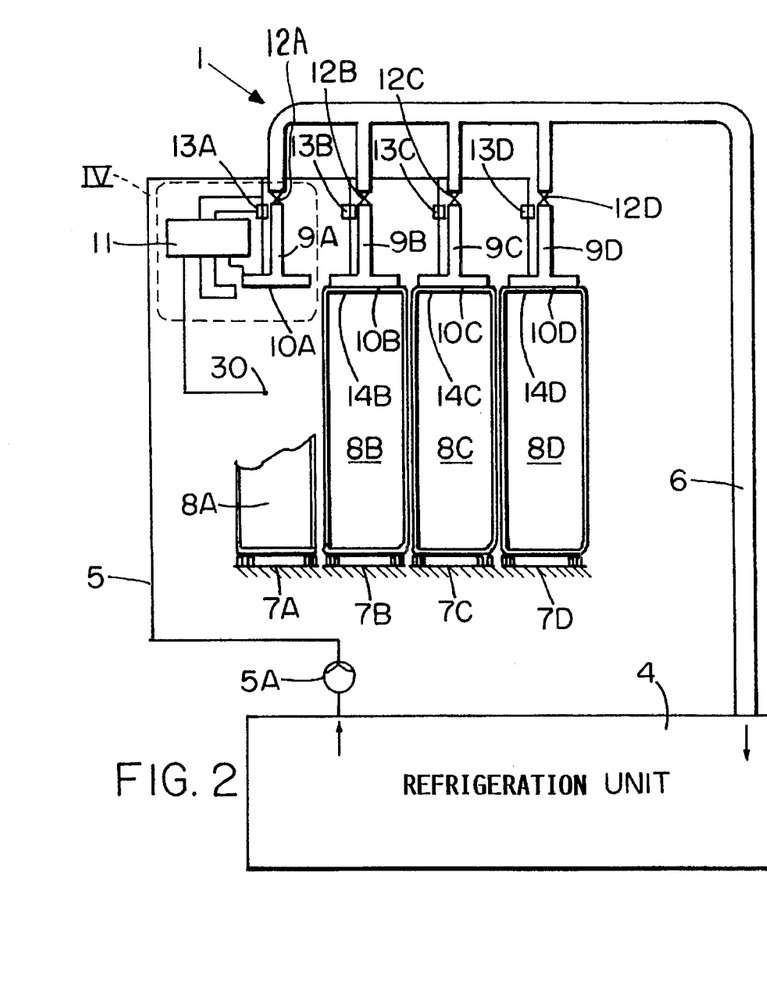
FIG. 2 shows schematically a plurality of heat exchangers constructed and positioned for contacting in a heat exchange manner a respective plurality of transport containers.

FIG. 2 shows an arrangement or embodiment with four parking spaces 7A, 7B, 7C and 7D for transport trolleys 8A, 8B, 8C and 8D. The primary coolant or refrigerant circulating circuit comprises the refrigeration unit 4, a supply duct 5, and a vapor return duct 6 with a pump 5A in the supply duct 5. Four heat exchangers 9A, 9B, 9C and 9D are constructed, for example, as evaporators and are equipped with a respective heat exchange surface 10A, 10B, 10C and 10D preferably facing downwardly for contacting a respective heat exchange surface 14A, 14B, 14C and 14D of the trolleys preferably facing upwardly. A closed loop control circuit or circuits 11 control the injection of liquid refrigerant into the heat exchangers 9A, 9B, 9C and 9D and the withdrawal of vaporized refrigerant from these heat exchangers. For this purpose, the supply pipe or duct 5 is provided with branch lines leading to each heat exchanger. Each branch line is equipped with an injection valve 13A, 13B, 13C and 13D. Similarly, the return pipe or duct 6 is equipped with branch lines leading to each heat exchanger 9A, 9B, 9C and 9D. A return flow valve 12A, 12B, 12C and 12D is positioned in each return branch line and controlled by the circuit or circuits 11 to be described in more detail below with reference to FIG. 5. The parking spaces 7A, . . . 7D are conventionally provided in the respective galleys 3A to 3E. Although FIG. 2 shows that each heat exchanger 9A to 9D cooperates with a respective cooling surface 14A, 14B, 14C and 14D of a corresponding trolley, it is possible to dimension the heat exchange surfaces of the heat exchangers 9 in such a way that they cooperate with more than one trolley.

Further, the heat exchangers are shown to contact top surfaces of the trolleys 8. However, it is also possible to contact other trolley wall surface portions constructed for heat exchange. However, positioning the heat exchange surface 14A in the cover plate 14 of each trolley is preferred. The heat transfer is accomplished in accordance with the so-called cascading circuit principle. A sufficiently close contact between the heat exchange surfaces 14A, 14B, 14C and 14D on the trolleys with the respective heat exchange surfaces of the corresponding heat exchanger 9A to 9D may be accomplished by a suitable lifting and lowering device or a respective press-on head, refer to FIGS. 6 to 9. Piston cylinder devices would be suitable for this purpose for example. The lifting and lowering devices could be operated automatically or manually. A manual operation is especially suitable when the heat exchangers are flexible supported in vertically direction, whereby it is possible to lift the respective evaporator or heat exchanger 9 sufficiently off the trolley so that the trolley 8 clears the contact surface 10 for removal from the galley 3. The lifting and lowering devices are so constructed that the respective heat exchanger is maintained in the lifted position until another trolley is inserted into the parking space 7. Thereafter, the heat exchanger 9 with its surface 10 is lowered again into contact with the respective trolley heat exchange surface 14A on the upper cover plate 14 of the respective trolley 8.

Figure 6:
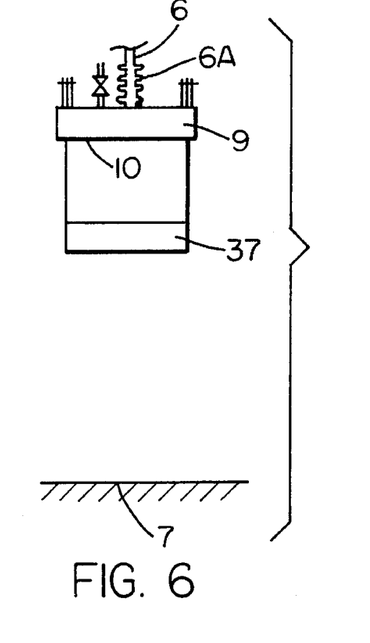
FIGS. 6, 7, 8, 9 show devices for lifting and lowering a heat exchanger onto a heat exchanger surface of a trolley.
Figure 7:
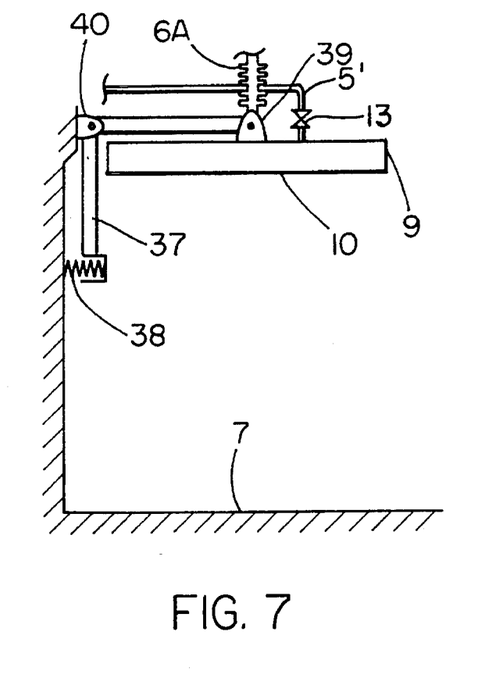

In FIGS. 6 and 7 there is shown an embodiment of the lifting and lowering mechanism in the raised position of the evaporator 9. The compression spring 38 is connected to the evaporator 9 by an angular lever 37 and support elements 39, 40. The compression force of the spring 38 holds the evaporator 9 in the raised position. The supply duct 5' is so arranged that it can displace itself a little vertically. The return duct 6 is for example provided with a metallic bellows 6A, which also permits a displacement in the vertical direction.

Figure 8:
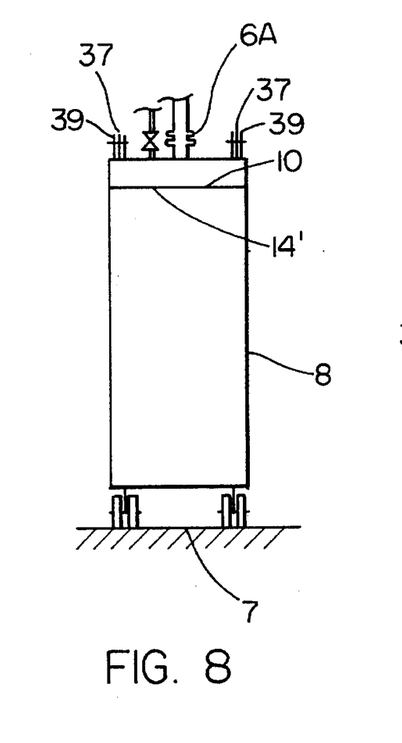
Figure 9:
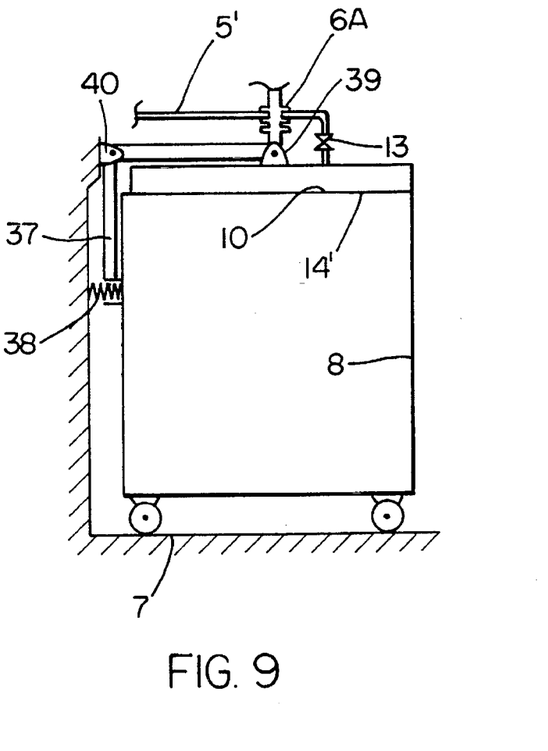

FIGS. 8 and 9 show the arrangement with a parked trolley 8. The trolley 8 presses onto the lever 37 which thus presses the evaporator 9 downwardly, thereby bringing the contact surfaces 10 and 14' into connection.

Figure 3:
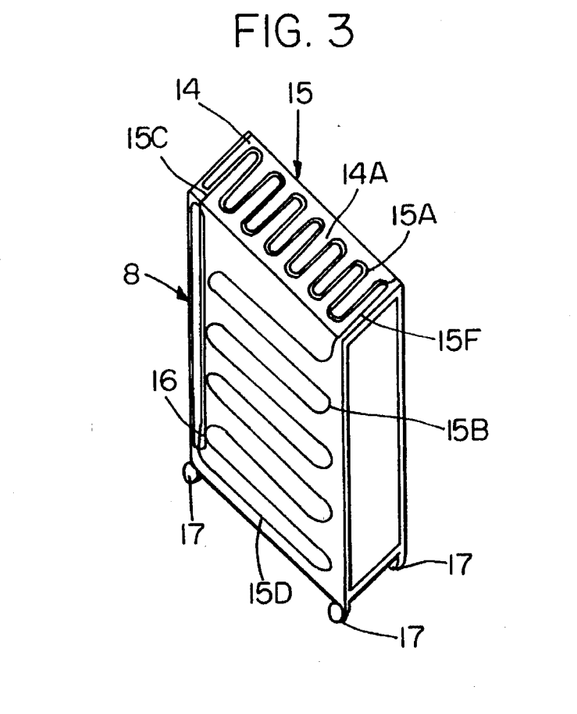
FIG. 3 shows a transport container according to the invention with a heat exchange surface.

FIG. 3 shows a trolley 8 equipped with a secondary coolant circulating circuit comprising meandering cooling pipes 15 forming a closed circuit. A first panel 15A of a meandering pipe is incorporated into the top cover 14 of the trolley 8. The top cover 14 has a surface forming the second heat exchange surface 14A that cooperates with the downwardly facing heat exchange surface 10A of the heat exchanger 9A shown in FIG. 2 for cooling the coolant that circulates in the panel of a meandering pipe. A further panel 15B of a meandering pipe is incorporated into a side wall of the trolley 8. A first end leg 15C of the meandering pipe panel 15A is connected to a heat insulated fall pipe section 16 which in turn is connected to a leg 15D of the meandering pipe panel 15B at the lower end thereof. The upper end 15E of the pipe panel 15B is connected to a second leg 15F of the meandering pipe panel 15A thereby forming the secondary coolant circulating closed circuit. Cold coolant falls down through the fall pipe section 16 since a thermal gradient exists between the heat exchanger 9A and the top cover 14 of the trolley 8 due to the continuous evaporation of refrigerant in the heat exchanger 9 of the primary refrigerating circuit. As the coolant in the secondary circuit warms up, it travels upwardly through the meandering pipe panel 15B and back into the panel 15A. This circulation of the coolant in the secondary circuit is maintained in accordance with the thermal siphon principle which works efficiently if the fall pipe 16 is heat insulated. Although a meandering panel is shown in only one side wall of the trolley in FIG. 3, the opposite side wall may be equipped with such meandering pipe panels. When the warmed up coolant is cooled down again in the upper meandering pipe panel 15A, the recirculation is repeated.

FIG. 4 illustrates a primary refrigerant circulating circuit with a refrigeration unit 4 constructed as a sorption device. The liquid refrigerant again travels through the pipe 5 to the individual galley 3A to 3E. Details of the galleys 3A, 3C, 3D and 3E are not shown because they are all identical to the details shown for galley 3B which has six parking spaces 7, 7A, 7B, 7D and 7E for trolleys not shown in FIG. 4. Branch lines 5' extend from the supply pipe 5 to each heat exchanger 9. An injection valve 13 for injecting refrigerant into the respective heat exchanger 9 is provided in each branch line 5' and controlled by the above mentioned closed loop control circuit 11, only one of which is shown in FIG. 4. All closed loop control circuits 11 are of the same construction as shown in FIG. 5. Vaporized refrigerant is discharged through discharge valves 12 which are also controlled by the closed loop control circuit 11.

The circuit 11 has several inputs, for rated and actually sensed control values. These inputs are connected, for example to a temperature sensor 30 or 30' and several other sensors and rated value pick-ups to be described below with reference to FIG. 5.

The sorption refrigeration unit 4 of FIG. 4 comprises substantially two periodically working, parallel connected boiler adsorbers 18 and 19, each having a heat input QIN and a heat output QOUT. These adsorbers 18 and 19 work in a quasi-continuous operation by sequentially adsorbing and desorbing the cooling medium such as water by a sorption agent, such as a zeolite. This pair of working materials, namely a zeolite and water are ecologically and physiologically acceptable and thus usable in a refrigeration unit that applies the sorption technique in an aircraft. An advantage of this use of sorption and desorption for refrigeration purposes provides an effective alternative to compressor refrigerators using CFSs as refrigerants.

A vacuum is maintained in the primary coolant flow circuit formed by the pipes or ducts 5 and 6. The vacuum range is not too critical and may be maintained by a vacuum pump 22 connected to an extraneous gas conduit 25 which in turn is connected through a valve 26 to a pipe 26A that interconnects the two adsorbers 18 and 19. The vacuum pump 22 is further connected through a valve 26' and a branch line 26A to a collecting container 27 for the desorbed cooling medium such as water. The valves 26 and 26' make it possible to selectively pump out extraneous gases from the container 27 or from the adsorber units 18 and 19 if necessary when extraneous gas may have entered into these components.

The cooling process proceeds in the refrigeration unit 4 as follows. The sorption agent such as a zeolite in the boiler adsorber 18 is heated up by applying heat to the absorber 18 as symbolically indicated with the arrow QIN. The heat source for heating the adsorber 18 is preferably tapped off from the aircraft engines. As a result of the heating of the sorption device 18, the water taken up by the zeolite is driven out in the form of water vapor and passed through a valve 20 and a desorption conduit 24 through a condenser 23 which gives off heat as indicated at QOUT. The condenser 23 liquifies the desorbed vapor coming in through the conduit 24 and the respective liquified cooling medium is collected in the container 27. The pump 5A in the coupling medium supply pipe or duct 5 provides a sufficient pressurization of the cooling medium for passing the cooling medium through the injection valves 13 at the inlet of the respective heat exchanger 9 constructed as a vaporizer. The closed loop control circuit 11 adjusts the heat exchanger 9 constructed as an evaporator in such a way that the cooling capacity required for the transport trolley 8 is delivered through the heat exchange surfaces 10 and 14A. By evaporating of the refrigerant in the heat exchanger 9 at low pressure heat is withdrawn from the coolant circulating secondary circuit in the transport trolley 8. The evaporated cooling medium is sucked back through the return duct or pipe 6 into the sorption device 4.

If sufficient cooling mediums has been desorbed in the boiler adsorber 18, the heat supply QIN is stopped and the three-way valve 20 is switched to open the line to the other boiler adsorber 19 which now begins the desorption phase. Meanwhile, the adsorption phase begins in the boiler adsorber 18 which receives cooling medium vapor through the return duct 6 with the three-way valve 21 positioned to close the path to the adsorber 19 and opening the path to the adsorber 18, whereby the evaporated cooling medium is adsorbed in the adsorber 18. Preferably, cabin air from the passenger cabin or RAM air is used for removing heat QOUT from the boiler adsorbers 18 or 19 during the adsorption phase and for removing heat QOUT from the condenser 23. With the sequential switch-over between the boiler adsorbers 18 and 19 a substantially continuous refrigeration is possible. Such a periodically operating sorption device operates with the same liquefying and evaporating processes as a compression refrigeration machine. Thus, it is possible to use for the condenser and for the evaporator the same structural components.

FIG. 5 shows details of the closed loop control circuit 11 enclosed by a dashed line V in FIG. 4. The circuit 11 is a closed loop control circuit for controlling the quantity of cooling medium required in the heat exchangers or evaporators 9. The circuit 11 comprises two separate controller 34 and 35. One controller 34 controls the valve or valves 13 for the injection of liquid cooling medium into the evaporator 9 while the other controller 35 controls the valve or valves 12 for the withdrawal of evaporated cooling medium from the respective evaporator 9. The respective cooling capacity is adjusted in accordance with the rated temperature for the particular transport trolleys 8, 8A . . . . This temperature is on average within a range of 1° to 7° C. and this temperature must be maintained even for different cabin temperatures. This cooling condition is realized through the closed controller 35 connected to the valve or valves 12. The closed loop controller 34 for the injection valve or valves 35 makes sure that sufficient cooling medium is always available in the heat evaporator 9.

The control of the injection volume cooling medium through the valve 13 is accomplished by the controller 34 in response to a rated temperature condition provided by the adjustable input pick-up 28 and three actual operating conditions. The first actual operating condition is a present signal signifying the presence of a trolley in its parking space with the help of a sensor such as a switch 29 that closes a circuit when a transport trolley 8 is present in its respective parking space 7, 7A . . . . The sensor or switch 29 is directly connected to one input of the closed loop controller 34. The second actual input value or operating condition is provided by a temperature sensor 30 connected through a measuring transducer 33 to a respective input of the section 34. The third actual input valve is provided by a filling level sensor 31 supplying its sensor signal through a measuring transducer 33 to a respective input of the controller 34. Preferably, the rated value input 28 is preferably an adjustable input rather than a fixed input valve. This adjustment can be made, for example, as a function of the cabin temperature. This adjustment may be a manual adjustment. However, it is also possible to provide the rated input valve as a fixed value, e.g. by setting a thermostat to a required value.

The injection valve 13 is opened when the following conditions prevail. First: sensor 29 indicates that a transport trolley 8 is present in its parking space 7. This signal from the sensor 29 signifies that the contact surfaces or heat exchange surfaces 10 and 14A are in contact with each other. Second: the sensor 31 connected through a transducer 33 provides a signal representing an actual filling level in the evaporator 9. Third, a temperature sensor 30 connected through the respective measuring transducer 33 to the controller 34 provides an actual temperature value. The use of the temperature sensor 30 is optional. If the temperature sensor 30 is used, its output signal is compared in the controller section 34 with the rated temperature value. Similarly, the output signal of the level sensor 31 is compared with a respective rated level value. These rated values are stored in a memory of the controller 34 which also comprises respective comparator circuits to generate the valve control signal for the valve 13.

With regard to the actual temperature value provided by the sensor 30 it is to be taken into account that due to the heat capacity of the trolley 8 there is a time delay until the desired temperature is established in the food stuffs held in the trolley 8. Thus, it is preferable to measure the actual filing level with the sensor 31 in addition to ascertaining the actual position through the position sensor 29. The filling level sensor 31 measures the actually injected cooling medium volume in the or evaporator 9.

The closed loop control of the valve or valves 12 is accomplished by the above mentioned closed loop control 35 also having four inputs. One input is connected to the preferably adjustable rated temperature value input provided by the rated value pick-up such as a thermostat 36. The second input is connected through a measuring transducer 33 to the actual temperature sensor 30. The third input is connected directly to the position sensor 29. The fourth input is connected through a measuring transducer 33 to a pressure sensor 32. The rated value pick-up 36 is preferably connected to a central processing unit in the control circuit 11 or in the aircraft, whereby the rated value is adjustable in response to a further closed loop control value, for example the cabin temperature. A manual adjustment of the pick-up 36 is alternatively possible. For that purpose the pick-up 36 may be a thermostat that is either adjustable or fixed to a determined rated value.

The adjustment is such, that the discharge valve 12 has a minimum through flow during the entire cooling process to avoid a bursting of the evaporator 9 when the cooling medium should freeze. In order to control the valve 12 it is necessary that the position sensor 29 provides a signal signifying that a trolley 8 is positioned in its parking space 7 and that the contact surfaces 10 and 14A are in fact contacting each other. The required opening through-flow cross-sectional area through the discharge valve 12 is controlled in response to at least one of the following conditions. Namely, that the pressure sensor 32 provides an actual pressure signal signifying that the measured pressure in the evaporator 9 deviates from a rated pressure value, or the actual temperature sensed by the sensor 30 in the trolley 8 deviates from a rated temperature value.

The pressure in the evaporator 9 thus depends on the temperature in the trolley 8, thereby assuring a safe operation. The closed loop control of the discharge valve 12 takes thus into account that due to the heat capacities of the trolley 8 a time delay occurs until the desired temperature of the foodstuffs in the trolley 8 has been reached. The direct measuring of the pressure in the evaporator 9 is preferred for the described closed loop control, as compared to only using the measured temperature. The measuring of the temperature is only a preferred embodiment for safety reasons. The control in both closed loop controller 34 and 35 is accomplished through logic circuits, preferably provided by a microprocessor that may be part of a central processing unit or each circuit 11 may have its own microprocessor.

Rather than using water as the cooling medium, the primary cooling circuit may circulate another heat carrier cooling liquid, for example a mixture of water and glycine. In such an embodiment the refrigeration of the respective heat exchanger 9 in the galleys can be substantially controlled with a volume flow valve which in turn is controlled by the circuit shown in FIG. 5. The circuit in turn is controlled by a processing unit such as a central processing unit responsive to a rated value pick-up or input. The rated value is preferably adjusted in a variable manner in dependence of a further closed loop control value, for example the cabin temperature. The adjustment may be performed manually for example by adjusting a thermostat or a fixed value may be set. Further, the control becomes effective only in response to the fact that a transport container 8 is positioned in its parking space 7a, . . . . The initial temperature of the foodstuffs to be cooled or selectively the temperature of the heat exchanger is taken into account by temperature sensors 30, 30' providing input values for the closed loop control circuits.

The combination of the closed loop control with the rated input values that are either controllable or fixed, as taught herein provides refrigeration that is adapted at any time to the required refrigeration needs in the trolleys. It is preferred to place the heat exchangers 9 so that their horizontally extending heat exchanger surfaces 10, . . . face downwardly to contact the top surfaces 14A, . . . of the trolleys facing upwardly, whereby the heat exchange is particularly efficient since the generated cold air tends to drop down naturally. Additionally, this arrangement makes efficient use of the space available in a galley on board an aircraft.

In order to easily remove any of the trolleys, it is preferred to connect the heat exchangers 9 to lefting devices. At least the branch section of discharge pipe could be telescoped within a guide pipe that simultaneously serves as a return flow conduit to the refrigeration unit, whereby the heat exchanger could even be manually lifted slightly to clear the top surface of the trolley below.

According to the invention the refrigeration unit 4 can be constructed as a compression refrigeration device or as a sorption refrigeration device, whereby the selection will be made in accordance with particular requirements of an aircraft type. In both instances the required pumps will provide the required circuit of the refrigerant in the primary cooling circuit.

Even in the embodiment which uses a sorption cooling device a substantially continuous operation is possible because the switch-over from one adsorber 18 to the other adsorber 19 and vice versa with the aid of the valves 20 and 21 is quickly accomplished. As mentioned, a zeolite in useful as a sorption medium while using water as the refrigerant.

A sorption refrigeration unit may also comprise but one boiler and one absorber connected in series, whereby a continuous adsorption of the refrigerant and desorption thereof can be maintained if necessary by a pump that may be selectively switched on and off and including a condenser and, if desired, a refrigerant collecting chamber 27.

Both of the above mentioned valves 12 and 13 for the return of the evaporated refrigerant and for the injection of the liquid refrigerant into the heat exchangers 9, are volume flow control valves which are controlled in closed loop fashion and in response to the rated values as described above.

The present system works equally well if the closed loop control circuit has its own central processor or microprocessor or if all circuits are controlled by a central processing unit in the aircraft. In both instances the rated value pick-up or input device 28, 36 is preferably programmable in response to the cabin temperature.

Although the invention has been described with reference to specific example embodiments, it will be appreciated that it is intended to cover all modifications and equivalents within the scope of the appended claims.

What is claimed is:

1. An apparatus for cooling food stuffs in a transport trolley, comprising at least one parking space (7) for said transport trolley (8), a heat exchanger (9) positioned for cooperation with said transport trolley in said parking space, a first heat exchange surface (10, 10A, A, B, . . . ) as part of said heat exchanger (9), a second heat exchange surface (14, 14A, . . .) as part of said transport trolley positioned for heat exchange between said first and second heat exchange surfaces when said transport trolley is in said parking space, a primary coolant or refrigerant circulating circuit for cooling said second heat exchange surface through said first heat exchange surface a secondary coolant circulating circuit in said transport trolley cooperating with said second heat exchange surface for cooling said food stuffs in said transport trolley, a refrigerating unit (4) and coolant or pipes (5, 6) interconnecting said refrigerating unit (4) with said heat exchanger (9) for cooling said first and second heat exchange surfaces when said transport trolley is in said parking space.

2. The apparatus of claim 1, further comprising a closed loop control (11) arranged for cooperation with said heat exchanger (9).

3. The apparatus of claim 1, wherein said heat exchanger (9) is arranged above said transport trolley in such a position that said first head exchange surface can contact said second heat exchange surface for cooling said food stuffs by heat removal through said second heat exchange surface of said trolley.

4. The apparatus of claim 3, wherein said first heat exchange surface of said heat exchanger (9) faces substantially downwardly, and wherein said second heat exchange surface of said transport trolley is formed as a top cover of said transport trolley so that said first and second heat exchange surfaces contact each other when said transport trolley is in said parking space.

5. The apparatus of claim 1, further comprising a drive mechanism connected to at least one of said first and second heat exchange surfaces for moving the respective heat exchange surface toward and away from each other to contact said heat exchange surfaces with each other and to separate said heat exchange surfaces from each other.

6. The apparatus of claim 1, wherein said heat exchanger is constructed as an evaporator (9).

7. The apparatus of claim 1, wherein said refrigerating unit (4) comprises a compression cold vapor refrigeration machine and an evaporator (9) forming said heat exchanger, said refrigerant conduits comprising a first refrigerant flow pipe (5) for liquid coolant or refrigerant connecting said refrigeration machine (4) to said evaporator (9) and a second refrigerant flow pipe (6) for vaporized coolant or refrigerant connecting said evaporator (9) to said refrigeration machine (4) for returning evaporated coolant to said refrigeration machine.

8. The apparatus of claim 7, further comprising a pump (5A) in said first refrigerant flow pipe (5) for transporting liquid refrigerant to said evaporator (9).

9. The apparatus of claim 1, wherein said refrigerant unit (4) comprises a sorption device (4) and an evaporator (9) forming said heat exchanger, said refrigerant pipes comprising a first refrigerant flow pipe (5) for liquid refrigerant connecting said sorption device (4) to said evaporator (9) and a second refrigerant flow pipe (6) for vaporized refrigerant connecting said evaporator (9) to said sorption device for returning evaporated refrigerant to said sorption device (4).

10. The apparatus of claim 9, further comprising a pump (5A) in said first refrigerant flow pipe (5) for transporting liquid refrigerant to said evaporator (9).

11. The apparatus of claim 1, wherein said refrigerating unit (4) comprises two boiler adsorbers (18, 19) connected in parallel with each other and operating periodically, said adsorbers holding a sorption agent which adsorbs and desorbs a coolant in a quasi-continuous process, said refrigerating unit further comprising a condenser (23) and a refrigerant collecting container (27).

12. The apparatus of claim 11, further comprising a vacuum pump (22) and a pump control for switching said pump on and off as required.

13. The apparatus of claim 9, wherein said sorption device (4) comprises a boiler and an adsorber connected in series with each other for adsorbing and desorbing refrigerant in a continuous process.

14. The apparatus of claim 13, further comprising a pump and a pump control for switching said pump on and off as required, a condenser, and a refrigerant collecting container.

15. The apparatus of claim 2, wherein said closed loop control (11) comprises a microprocessor.

16. The apparatus of claim 2, comprising a central processor unit, a plurality of heat exchanger devices (9, 9A, ... 9D) connected to said closed loop control integrated into said central processing unit.

17. The apparatus of claim 2, wherein said closed loop control (11) for the respective heat exchanger (9) comprises a refrigerant injection controller (34) and a refrigerant discharge controller (35), a respective rated value pick-up (28, 36) connected to said refrigerant injection controller (34) and to said refrigerant discharge controller (35), at least one position sensor (29) for sensing the presence of said transport trolley in said parking space and for providing a respective presence signal from said position sensor (29) to said injection controller (34) and to said discharge controller (35).

18. The apparatus of claim 17, wherein said position sensor is a switch, a magnetic sensor, a capacitive sensor, or a load cell, and wherein said refrigerant discharge controller and said refrigerant injection controller comprise respective volume flow control valves (12, 13).

19. The apparatus of claim 17, further comprising at least one temperature sensor (30) for said transport trolley, a measuring transducer (33) connecting said refrigerant injection controller (34) for providing a temperature representing control signal from said temperature sensor (30) to said refrigerant injection controller (34).

20. The apparatus of claim 17, further comprising at least one filling level sensor (31) in said heat exchanger (9), a measuring transducer connecting said filling level sensor (31) to said refrigerant injection controller (34) for providing a filling level representing control signal from said filling level sensor (31) to said refrigerant injection controller (34).

21. The apparatus of claim 17, further comprising at least one temperature sensor (30) for said transport trolley, a measuring transducer (33) connecting said refrigerant discharge controller (35) to said temperature sensor (30) for providing a temperature representing control signal to said refrigerant discharge controller (35).

22. The apparatus of claim 17, further comprising at least one pressure sensor (32) in said heat exchanger (9), a measuring transducer (33) connecting said pressure sensor (32) to said refrigerant discharge controller (35) for providing a pressure representing control signal to said refrigerant discharge controller (35).

23. The apparatus of claim 17, further comprising at least one temperature sensor (30), at least one filling level sensor (31) and respective measuring transducers (33) connecting said temperature sensor (30) and said filling level sensor (31) to said refrigerant injection controller (34).

24. The apparatus of claim 23, wherein said temperature sensor (30) is also connected to said refrigerant discharge controller (35) through said respective measuring transducer (33).

25. The apparatus of claim 17, further comprising at least one temperature sensor (30), at least one pressure sensor (32) in said heat exchanger (9) and respective measuring transducers (33) connecting said temperature sensor (30) and said pressure sensor (32) to said refrigerant discharge controller (35).

26. The apparatus of claim 25, wherein said temperature sensor is also connected to said refrigerant injection controller (34) through said respective measuring transducer (33).

27. The apparatus of claim 17, further comprising at least one temperature sensor (30) and a measuring transducer (33) connecting said measuring transducer to said refrigerant injection controller and to said refrigerant discharge controller, said temperature sensor being positioned for sensing at least one temperature.

28. The apparatus of claim 27, comprising a first temperature sensor (30) for measuring a temperature in said transport trolley, a second temperature sensor (30') for measuring a temperature in said heat exchanger (9).

29. The apparatus of claim 17, wherein said rated value pick-ups (28, 36) are adjustable to desired cooling temperature.

30. The apparatus of claim 29, wherein said rated value pick-ups (28, 36) are programmable in dependence on a cabin temperature in an aircraft.

* * * * *

UNITED STATES PATENT AND TRADEMARK OFFICE
CERTIFICATE OF CORRECTION

PATENT NO.  : 5,491,979
DATED       : Feb. 20, 1996
INVENTOR(S) : Harald Kull et al.

It is certified that error appears in the above-identified patent and that said Letters Patent is hereby corrected as shown below:

Column 1, line 55, replace "blow" by --blown--;
Column 2, line 41, replace "-glycol-mixture" by --water-glycol-mixture--;
Column 4, line 45, replace "flexible" by --flexibly--, after "in" insert --the--;
Column 4, line 46, replace "vertically" by --vertical--;
Column 5, line 67, replace "CFSs" by --CFCs--;
Column 6, line 26, replace "coupling" by --cooling--;
Column 6, line 40, replace "mediums" by --medium--;
Column 6, line 64, replace "controller" by --controllers--;
Column 7, line  8, replace "valves 35" by --valves 13--;
Column 7, line 24, replace "valve" by --value--;
Column 7, line 27, delete "preferably";
Column 7, line 28, replace "valve" by --value--;
Column 7, line 32, replace "valve" by --value--;
Column 7, line 61, delete "or";
Column 8, line 37, replace "controller" by --controllers--;
Column 8, line 56, replace "7a,...." by --7A,....--

UNITED STATES PATENT AND TRADEMARK OFFICE
CERTIFICATE OF CORRECTION

PATENT NO.  :  5,491,979
DATED       :  Feb. 20, 1996
INVENTOR(S) :  Harald Kull et al.

It is certified that error appears in the above-identified patent and that said Letters Patent is hereby corrected as shown below:

Column 9, line 6, replace "lefting" by --lifting--;
Column 9, line 17, replace "circuit" by --circulation--;
Column 9, line 61, after "surface" insert --,--;
Column 9, line 64, before "pipes" insert --refrigerant--.

Signed and Sealed this

Fourth Day of June, 1996

Attest:

BRUCE LEHMAN

Attesting Officer        Commissioner of Patents and Trademarks